(12) United States Patent
Mahaffey

(10) Patent No.: US 9,776,550 B2
(45) Date of Patent: Oct. 3, 2017

(54) TENSIONING DEVICE

(71) Applicant: Pacific States Manufacturing, Inc., Buhl, ID (US)

(72) Inventor: Jay Lawrence Mahaffey, Buhl, ID (US)

( * ) Notice: Subject to any disclaimer, the term of this patent is extended or adjusted under 35 U.S.C. 154(b) by 0 days.

(21) Appl. No.: 15/477,107

(22) Filed: Apr. 2, 2017

(65) Prior Publication Data

US 2017/0203680 A1    Jul. 20, 2017

Related U.S. Application Data

(63) Continuation-in-part of application No. 14/973,932, filed on Dec. 18, 2015, now Pat. No. 9,610,883.

(51) Int. Cl.
*B60P 7/08* (2006.01)

(52) U.S. Cl.
CPC ........... *B60P 7/0838* (2013.01); *B60P 7/0853* (2013.01)

(58) Field of Classification Search
CPC .............................. B60P 7/0838; B60P 7/0853
USPC ................ 410/101, 102, 106, 107, 111, 116; 248/499; 403/43, 44, 46, 48; 24/68 CD, 24/265 CD
See application file for complete search history.

(56) References Cited

U.S. PATENT DOCUMENTS

| | | | | |
|---|---|---|---|---|
| 6,048,146 | A * | 4/2000 | Wiedmeyer | B60P 7/083 410/100 |
| 6,065,914 | A * | 5/2000 | Fotou | B60P 3/079 410/100 |
| 7,458,757 | B1 * | 12/2008 | Manesis | B60P 7/0823 410/100 |
| 9,610,883 | B1 * | 4/2017 | Mahaffey | B60P 7/083 410/100 |

* cited by examiner

*Primary Examiner* — Stephen Gordon

(57) ABSTRACT

A tensioning device uses two perpendicular gears so that common hand tool such as wrenches or socket wrenches can be used to drive the gears to rotate a barrel having two oppositely threaded apertures. Shafts having complementary threads inserted into the threaded apertures and means for connecting chain, wire rope, cable, or straps will be extended or retracted when tools rotate the driving gear. End effectors on the shafts include hooks or clevises for securing cargo, pads for use as a jack, and ball ends for use as an adjustable mechanical linkage such as the top link of a three-point agricultural hitch. Load locks can secure the threaded shafts from unwanted rotation while in transit or in other service.

8 Claims, 5 Drawing Sheets

TENSIONING DEVICE

PRIORITY: CROSS-REFERENCE TO THE RELATED APPLICATION

This non-provisional utility application is a continuation-in-part application related to pending U.S. utility application Ser. No. 14/973,932 "Tensioning Device," filed Dec. 18, 2015, and the entire content of said utility application is incorporated into this document by reference. This application also claims the benefit of priority to said application Ser. No. 14/973,932 "Tensioning Device" for all applicable matter herein.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The invention relates to a tensioning device. A tensioning device is used to tighten a chain, cable, strap or similar material. There are several types of tensioning devices, including but not limited to load binders and turnbuckles.

Load binders are tools used to secure cargo or loads to trucks, ships, vessels or other types of load carriers. Cargo or load is a generic term and is used in the broadest sense possible, including but not limited to crates, boxes, logs, pipes, rods, and containers. A load binder is an apparatus for tensioning a chain, cable, strap or similar material to secure a load. Typically load binders secure loads to the carrier during transport or movement.

BACKGROUND OF THE INVENTION

Details of the background of the invention are available in the parent application Ser. No. 14/973,932 which as noted above has been incorporated into this application specification by reference.

The three-point hitch referred to in this application is known and has been in use for nearly a century, with one of the first U.S. patents being U.S. Pat. No. 1,379,399 issued to Harry Ferguson in 1919.

INTRODUCTION AND SUMMARY OF THE INVENTION

A general introduction to load binders and the basic structure of the invention is available in the related parent application incorporated herein by reference. Load binders are tensioning devices generally having two attachment points which according to the invention are also points where various other end effectors may be affixed. The inventive load binder is of generally longitudinal structure and includes at least one extensible member such that the length or distance between the two attachment points can be varied. Especially as a tensioning device, cargo straps, wire rope, cable, or chains can be attached to the two attachment points while slack, and then a mechanism offering great mechanical advantage can retract the extensible member, shortening the length or distance between the attachment points, and thereby draw the cargo straps, wire rope, cable, or chains taut.

Although the tensioning device of the invention is very suitable for securing cargo for transport, its mechanism of generating mechanical advantage is useful in other applications including but not limited to attachment, leveling, and safe and statically determinate positioning of ponderous agricultural implements by means of the standard three-point tractor hitch.

Furthermore, the great mechanical advantage of the invention can generate large compression forces as well as in tensions, allowing this device, when fitted with appropriate end effectors, to operate as a jack or other lifting device or support underlying a ponderous object.

It is therefore a first objective of the invention to provide a safer and easy method to securely stabilize ponderous objects by means of cargo straps, chains, or the like. It is especially advantageous that large forces for securing these objects can be developed even by users of modest physical strength.

It is also important that the mechanical advantage provided within the tightening mechanism does not operate in reverse of its own accord; for example, if the pitch of a threaded member is selected such that the angle of its helix is steep enough, the tension developed to secure the load will overhaul the mechanism instead, that is, the threaded member will pull out while forcing the complementary, threadably coupled member to which it is mated to rotate. Multiple threads are particularly susceptible to this unwanted effect. It is therefore another objective of the invention to afford sufficient friction so that once its components are tightened under load, the tension developed is preserved until the user loosens the device.

Another objective of the invention is to provide a linkage adjustable in length by means of great mechanical advantage wherein light or easy forces arising from human muscles, hand tools, or hand-held power tools can be translated into large, effective forces in tension or compression, for securing loads for transport, or for positive, statically determinate positioning of heavy agricultural attachments as part of a multiple-link hitch system, or for positioning and alignment, and coupling of the mechanically complementary portions of a trailer and the tractor or draft vehicle to pull the trailer.

Another objective of the invention is to implement the same mechanism used to derive tension forces at great mechanical advantage so that it can also be used at other times to generate and maintain similarly large forces in compression.

Another objective of the invention, as opposed to the operation of over-center latching means, is that during use, the magnitude of operating force remains proportional to the securing load developed by the invention while a load is being secured or positioned by the invention. This proportional relationship of forces provides good physical feedback to users having less physical experience with the required forces of the job at hand. The rise and fall of force required to operate an over-center device can surprise inexperienced users or people of modest strength and become a source or root cause of accident or other unsafe condition. Thus another objective of the invention is improved safety and reduced opportunity for worksite accidents, especially pinching or crushing injuries in the immediate proximity of ponderous objects being positioned, adjusted or secured.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

DETAILED DESCRIPTION of CERTAIN EMBODIMENTS

Figure 1:
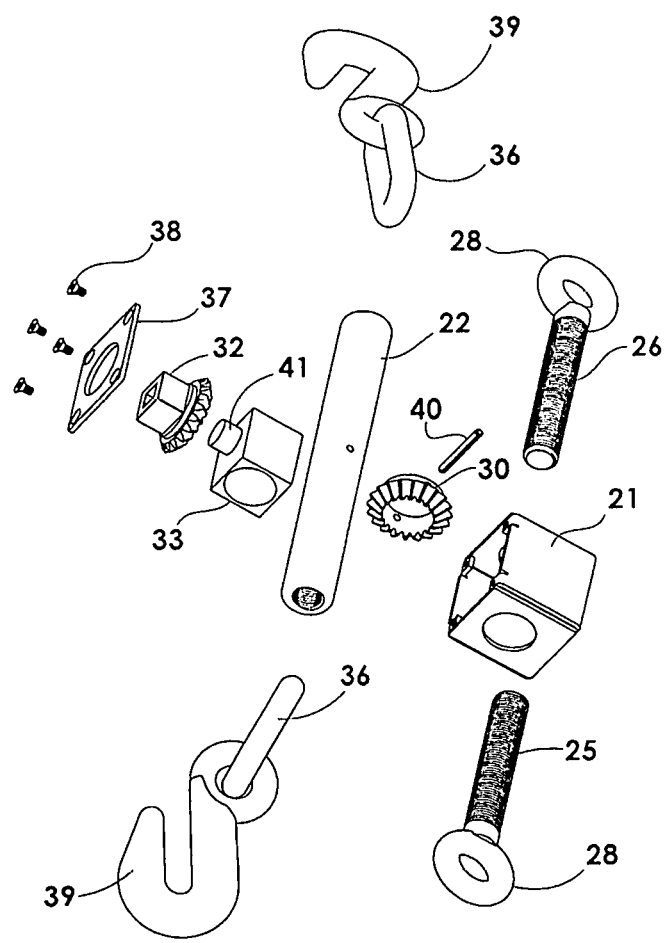
FIG. 1 shows an exploded view of an assembly according to the co-pending parent application.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention. In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this specification reference numerals are enclosed by square brackets, and punctuation marks such as commas or periods are placed inside the brackets and adjacent to the numeral character. (Similarly, punctuation marks for parenthetical phrases reside adjacent to the text characters and inside the parentheses.) This style differentiates between written English prose as opposed to lines of computer code or machine readable instructions.

Figure 2:
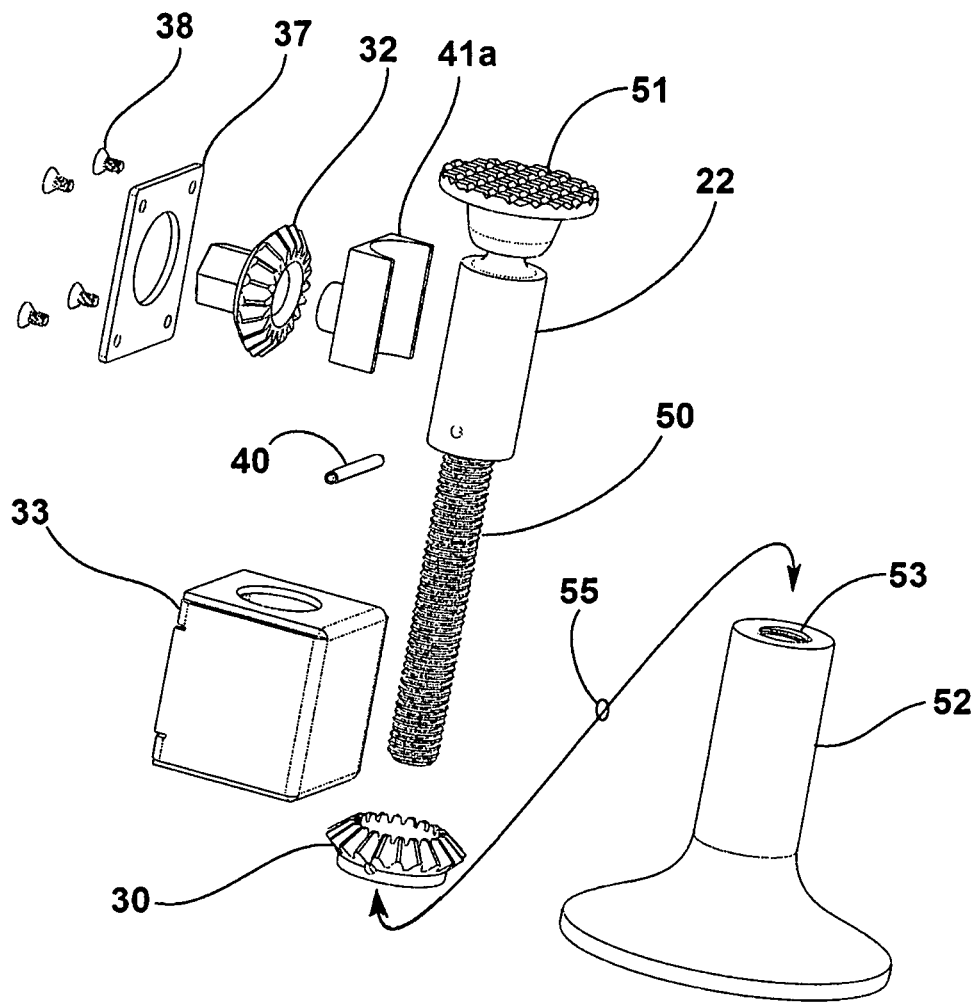
FIG. 2 shows an exploded view of an embodiment according to the invention adapted for operating in compression as a lifting jack.
Figure 3:
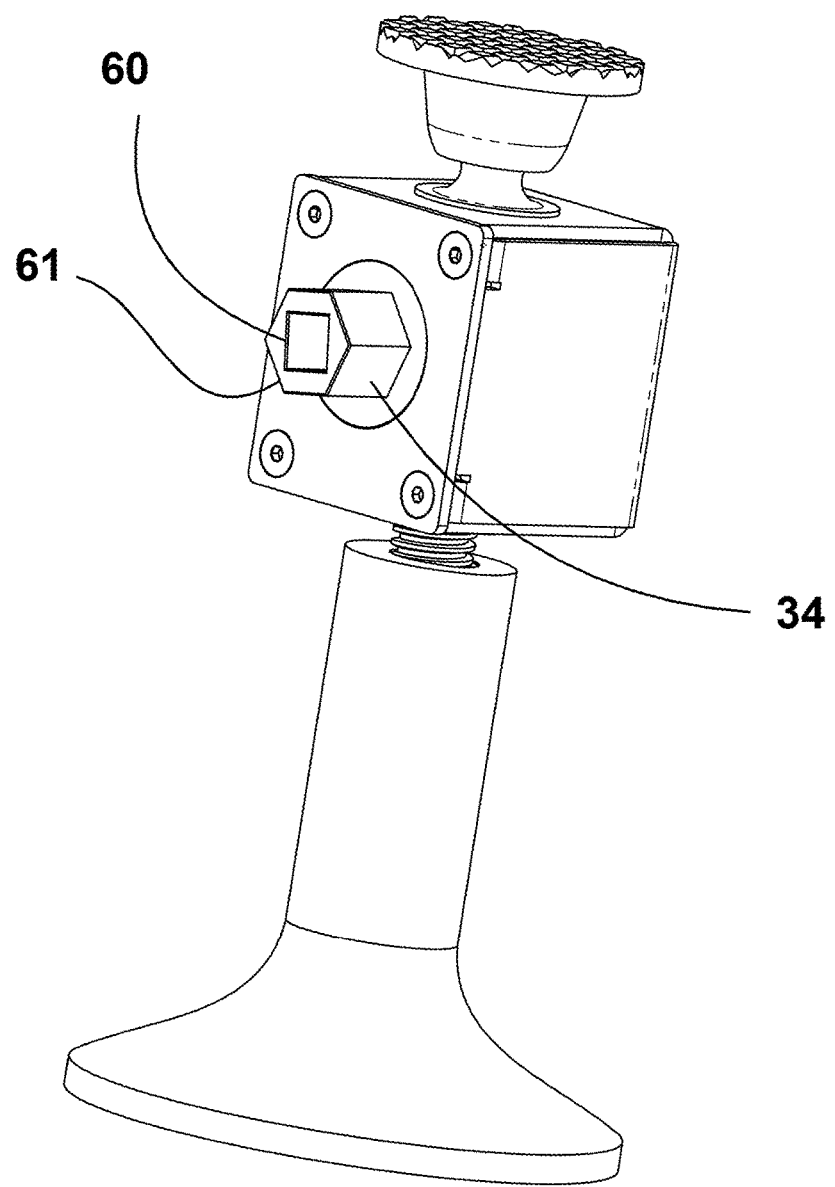
FIG. 3 shows the assembly of an embodiment according to the invention adapted for operating in compression as a lifting jack.

The introductory description is presented in the parent application in its description of FIGS. 1, 2, and 3 of that application. In this application FIG. 1 also shows a specific description of the invention. It is a tensioning device comprised of: a gear box [21,] a barrel [22] which is tubular shaped having an external diameter and a rotational axis along a length of the tube, a barrel gear [30] affixed to the exterior of said barrel with the barrel gear encircling the barrel perpendicular to the axis of the barrel's length, and guide [33] inside of said gear box with a stub extending out of the guide. The gear box has two holes of which the first hole is situated opposite from the second hole, and these two holes are sized to allow the barrel to pass through the gear box and are sized such that the barrel is able to rotate along its rotational axis. The guide also has two holes on its own sides, with the first hole is opposite from the second hole and sized to allow the barrel to pass through the guide holes as well, with the barrel able to rotate freely along the barrel's rotational axis.

The gear box is assembled such that the barrel passes through the two holes in the gear box and the two holes of the guide with the barrel gear located inside the gear box but outside the guide. The barrel gear 30 is attached to the barrel by means of a roll pin [40.] A drive gear [32] has a socket wrench receptacle placed over the stub, and the drive gear engaged with the barrel gear forms a bevel gear.

The guide has a stub [41] that extends out one side of the guide. The gear drive and socket wrench receptacle sit over the stub and are rotatably coupled to it, and the stub is located such that when the gear box is assembled the drive gear and barrel gear are engaged and the gears' teeth are mutually meshed for transmission of torque from the drive gear to the barrel gear.

A cover [37] encloses the drive gear inside the gear box, and the cover has a hole through which the socket wrench receptacle can pass through for rotating the socket wrench receptacle. A cover [37] and four screws [38] securing said cover to the gear box are shown as well.

In a preferred embodiment, the first end of the barrel includes right-hand threads within the first end of the barrel, while the second end of the barrel includes left-hand threads. Threadably coupled to these threaded members are two shafts, with the first shaft [25] having right-hand threads at one end, and the second shaft [26] having left-hand threads at one end. The first shaft is threaded coupled to the end of the barrel having the right-hand threads, and the second shaft is threadably coupled into the end of the barrel having the left-hand threads.

It is known that unwanted rotation between a mated pair of threadably coupled components (one having internal and the other having external threads) can be arrested by driving an additional internally threaded component to bear against the first internally threaded component. A simple example of this is that a nut located at a predetermined location along a threaded shaft can be locked into that position by driving a second nut into it from either axial direction. Double-nutting as this is sometimes called, is often employed in environments having moderate vibration such as in transport or shipping.

Threaded load tighteners similar to nuts or threaded washers, often having an eccentric perimeter or lobe or tab extending radially away from its internally threaded hole, are they used in the same manner as doubled nuts to lock turnbuckles and load binders against unwanted rotation after the device has taken up a tensile, axial load. It is similarly contemplated within the scope of the invention to include load tighteners threaded onto the threaded sections of shafts [25] and [26.]

The other ends of the first and second shafts have end effectors, which is a term including any of various means for connecting chain, cable, strap or similar material, or attachment points of ponderous objects to the shaft for operation in tension. In the embodiment shown in FIG. 1, the shaft ends not threadably inserted into the barrel terminate with eyes [28.] A link [36] and hook [39] are attached to each eye bolt for attaching to chain, cable, or attachment points on machinery to be secures, such as lifting rings or tow points on vehicle frames.

Other end effectors are designed to withstand and transmit compression forces into the shafts. An embodiment according to this aspect of the invention and adapted for jacking or lifting a load is shown in an exploded view in FIG. 2. The aforementioned cover [37] and four screws [38] securing said cover to the gear box [33] are seen here, as are the drive gear [32] and barrel gear [30] driven by it. The barrel gear is affixed to the barrel by a roll pin [40.]

The barrel [22] of this embodiment has a first end having external threads [50] and second end opposite the first having a lifting pad [51] which in a best mode is knurled, grooved, cross-cut, or waffled to provide a positive, non-slip contact with the load to be raised. Although in this embodiment the lifting pad is integral to the barrel and may be a single forged part for strength, other preferred embodiments contemplated within the scope of the invention include those having the lifting pad as a separate component swivelably coupled to the barrel end or threadably coupled to the barrel for fine height adjustment and mate-up of the lifting pad to the load. The rotational coupling between the barrel and the lifting pad allows barrel rotation during lifting or lowering without deleteriously forcing the lifting pad to rotate at its contact interface with the load in its lifting or lowering motion.

The threads of the first end of the barrel threadably insert into female threads [53] a footpad [52] It is generally preferred that the area of the footpad be larger and wider than the area of the lifting pad for improved stability and safety, although this area relationship is not strictly necessary. The double-headed, sigmoid-shaped arrow [55] in the figure illustrates that the in assembly the threaded end of the barrel passes through the barrel gear when coupled to the footpad.

Lastly of note in this figure, the guide may be constructed so as to completely encircle the barrel, or in accordance with this figure, the guide [41a] further comprises at least one cylindrical surface complementary to an external diameter of the barrel, and may need only extend partway around the barrel to adequately locate and stabilize it within the gear box. The roll pin being inserted transversely through the barrel extends beyond the outer diameter of the barrel at both its ends, and these ends insert into two holes in the barrel gear so as that rotation of this gear by the driving action of the drive gear forces the same rotation upon the barrel. In this configuration, a guide [41a] extending partway around the barrel and as a best mode extending halfway around the barrel is sufficient to stabilize the barrel during its rotation. In this embodiment, the cylindrical surface of the guide further comprises a substantially semi-circular cross section.

FIG. 3 shows the assembly of the embodiment adapted for jacking or lifting. Here the socket wrench receptacle [34] has a square pocket or aperture [60] and a polygonal outer perimeter [61] which in this embodiment is a hexagon. The socket wrench receptacle [34] is shown and can be rotated by whichever tool an operator might use as the means for rotating the drive gear and barrel gear. When operating as a jack, an appropriate sized impact or socket wrench is inserted into the receptacle and the receptacle is rotated to raise or lower the load. The contours of the aperture [60] and the outer perimeter [61] are shaped and sized to accept standard square-drive socket wrenches or hexagonal sockets mounted on socket wrenches. Additionally, air tools, electric or cordless drills may be affixed with drive bit which engage either or even both of these two features. Many other tools or means for rotating the drive gear are known or can be readily improvised by those skilled in the art, and it is not the intention of the inventor to limit the invention by use of the socket wrench receptacle. Also, rather than the square aperture as illustrated, a socket wrench receptacle having a hexagonal aperture is also contemplated within the invention, so that it can be driven by Allen wrenches at great mechanical advantage. Besides socket wrenches or Allen wrenches, the socket wrench receptacle may be driven by a crank with and end of the crank having a cross section shape able to be received into the aperture of the socket wrench receptacle, or able to grasp the outer perimeter for positive rotation of the socket wrench receptacle. An embodiment also exists wherein the crank is permanently connected to the socket wrench receptacle. This connection can be rigid or may include at least one articulated joint or similar connection, so that the crank can be conveniently folded away or collapsed when not in use.

Yet other end effectors can operate either in compression or in tension so that the invention can form a useful component in many different applications where multiple linkages operate in concert, especially but not limited to three point hitches used in agriculture and four-bar linkages used in general industrial machinery.

Figure 4:
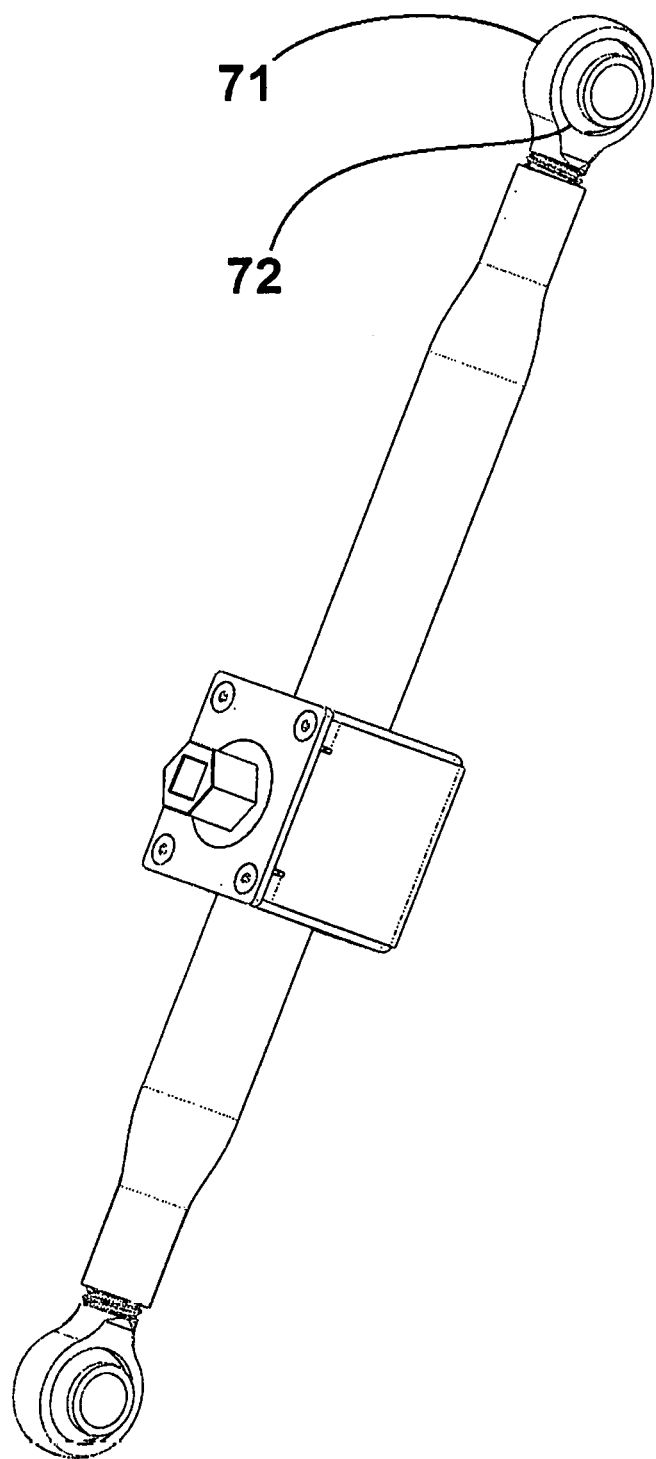
FIG. 4 shows the assembly of an embodiment according to the invention adapted for operating as a top link of a three-point hitch.

Thus another embodiment in accordance with the invention is configured as a top link for a three point hitch. FIG. 4 shows an assembly of this configuration. Similar to the eyes [28 in FIG. 1] of the parent invention, the end effectors of the top link embodiment are ball sockets sometimes also called ball ends, which comprise an external ring [71] having a concave spherical interior surface, which grips around the girth of a spherical journal member [72.] The hole passing though the journal member of the ball end can accept clevis pins or cotter pins and the like for coupling to attachment points on agricultural implements or other machinery.

Figure 5:
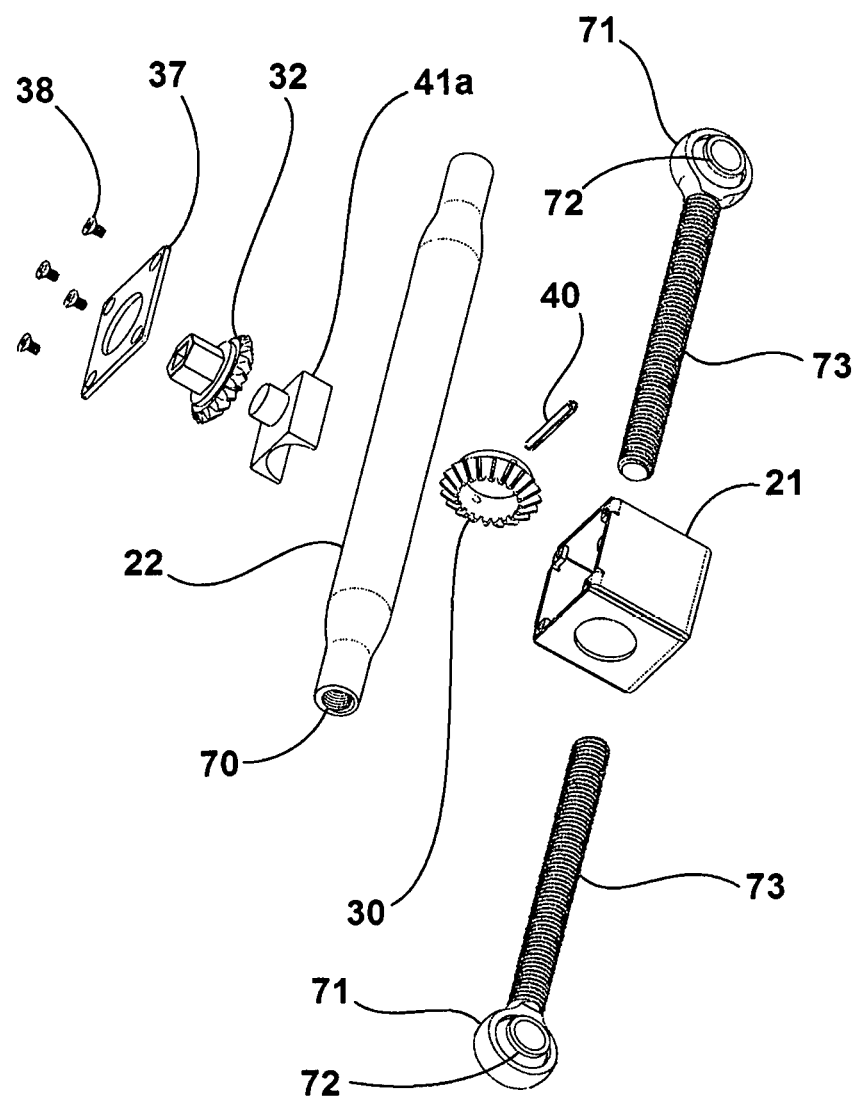
FIG. 5 shows an exploded view of an embodiment according to the invention adapted for operating as a top link of a three-point hitch.

FIG. 5 shows the same device as shown in FIG. 4, but with the components exploded. Here as previously detailed are seen the screws [38] and cover [37,] the drive gear [32,] barrel gear [30,] and roll pin [40,] the barrel [22] and gear box [21,] and a guide [41a] which embraces only halfway around the barrel. The internal threaded apertures [70] at the ends of the barrel receive externally threaded shanks [73] of two ball ends which have external rings [71] encircling spherical journal members [72.] The pair of ball ends are oppositely threaded, one left-hand thread and the other right-hand thread, as are the threaded apertures in the ends of the barrel. Thus, rotation of the barrel when the ball ends are constrained from axial rotation will cause the center to center distance between the ball end journals to extend or retract and generate great force while in motion. Employed as a top link or similar mechanical linkage of adjustable length, this configuration of the invention offers great utility in coupling agricultural implements to tractors, wherever linkages in assembly must endure heavy axial forces. These forces can be developed during installation or adjustments to coupled machinery with ease, speed, and greatly improved safety, especially when the forces applied to operate the drive gear originate from power tools or levers such as socket wrenches because users' hands and arms are relieved from having to apply or withstand heavy forces used to secure said machinery or implements.

Furthermore, although the pairs of gears in the illustration appear to have equal or nearly equal numbers of teeth, it is also contemplated within the scope of the invention that the driver gear may have a different number of teeth than the barrel gear, providing that all other gear design parameters are met for the gears' teeth to intermesh properly, i.e. pressure angle of tooth profiles, addendums, dedendums, diametral pitch, and so forth. It is especially contemplated that an additional stage of amplification of mechanical force can be created with a drive gear having fewer teeth than a barrel gear.

Further contemplated within the scope of the invention is that rather than using a roll pin, the barrel and barrel gear may be parts of a single, unitary component and especially a forged component where forging can add great strength and toughness to the barrel and teeth for improved safety, positive transfer of driving torque to the barrel, and extended wear life.

While certain features and aspects have been described with respect to exemplary embodiments, one skilled in the art will recognize that numerous modifications are possible. Further, while various methods and processes described herein may be described with respect to particular structural and/or functional components for ease of description, methods provided by various embodiments are not limited to any particular structural and/or functional architecture.

Hence, while various embodiments are described with or without certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

The invention claimed is:

1. A tensioning device, comprised of;
    a gear box,
    a barrel which is tubular shaped having an external diameter and a rotational axis along a length of said barrel,
    a barrel gear affixed to the exterior of said barrel with said barrel gear completely encircling said barrel perpendicular to said rotational axis of said barrel's length,
    a guide inside of said gear box with a stub extending from said guide;
    said gear box comprising
        first and second holes in said gear box, with said first hole situated opposite from said second hole, with both holes sized to allow said barrel to pass through said gear box,
        and sized such that said barrel is able to rotate along its rotational axis,
    said guide further comprising at least one cylindrical surface complementary to the external diameter of said barrel,
    with said barrel able to rotate freely along said barrel's rotational axis,
    said gear box assembled such that said barrel passes through said first and second holes in the gear box,
    a drive gear comprising a socket wrench receptacle placed over the stub of the guide and said drive gear engaged with said barrel gear to form a bevel gear,
    a cover enclosing said drive gear inside said gear box with a hole in said cover in which the socket wrench receptacle passes through for rotating the socket wrench receptacle,
    the barrel having first and second ends, said first end of said barrel comprising right-hand threads within said first end of said barrel, and said second end of said barrel comprising left-hand threads within said second end of the barrel,
    first and second shafts each having two ends, with
        said first shaft comprising right-hand threads at one of said ends of said first shaft and
        said second shaft comprising left-hand threads at one end of said second shaft,
        said first shaft threaded into the end of the barrel comprising the right-hand threads and
        said second shaft threaded into the end of the barrel comprising the left-hand threads,
        the other end of the first and second shafts comprising end effectors and
    means for rotating said socket wrench receptacle such that rotational motion of said socket wrench receptacle results in linear displacement of said shafts into or away from said gear box.

2. The tensioning device of claim 1, wherein said cylindrical surface of said guide further comprises a substantially semi-circular cross section.

3. The tensioning device of claim 1, wherein at least one of said end effectors is a means for connecting to a chain, wire rope, cable, strap or other material to said respective shaft.

4. The tensioning device of claim 1, wherein at least one of said effectors is a lifting pad.

5. The tensioning device of claim 1, wherein at least one of said effectors is a footpad.

6. The tensioning device of claim 1, wherein at least one of said effectors is a ball end.

7. The tensioning device of claim 1, further comprising a crank connected to said socket wrench receptacle.

8. The tensioning device of claim 7, wherein said crank further comprises at least one articulated joint.

* * * * *